United States Patent [19]

Ichiyoshi

[11] 4,339,725
[45] Jul. 13, 1982

[54] SYNCHRONOUS DEMODULATOR FOR MULTI-PHASE PSK SIGNAL

[75] Inventor: Osamu Ichiyoshi, Tokyo, Japan

[73] Assignee: Nippon Electric Co., Ltd., Tokyo, Japan

[21] Appl. No.: 133,744

[22] Filed: Mar. 25, 1980

[30] Foreign Application Priority Data

Mar. 30, 1979 [JP] Japan .................................. 54/39131

[51] Int. Cl.³ ........................ H03D 3/18; H04L 27/22
[52] U.S. Cl. ..................................... 329/50; 329/104; 329/122; 375/83
[58] Field of Search ................. 329/50, 104, 110, 112, 329/122, 124; 375/83–87, 94

[56] References Cited

U.S. PATENT DOCUMENTS

| 3,336,534 | 8/1967 | Gluth | 329/50 X |
| 3,745,458 | 7/1973 | Nakamura et al. | 375/86 X |
| 3,835,404 | 9/1974 | Nakamura et al. | 329/104 |

Primary Examiner—Siegfried H. Grimm
Assistant Examiner—Edward P. Westin
Attorney, Agent, or Firm—Sughrue, Mion, Zinn, Macpeak & Seas

[57] ABSTRACT

An N-phase PSK demodulator is disclosed wherein all circuits therein operate in a frequency band equal to or below the carrier band. The locally reproduced carrier is generated by a phase locked loop in combination with a frequency converter means and a divide-by-two frequency divider. The frequency converter means consists of n identical frequency converter circuits connected in series, where $2^n = N$. For a 2-phase PSK demodulator where $n = 1$, the 2-phase PSK modulated wave is applied as a first input and the reproduced carrier divided by two is applied as a second input to the frequency converter circuit. A mixer and filter provide as an output the difference frequency between the first and second inputs. The latter output is multiplied by two and applied as the input to the phase locked loop. Where $n > 1$, the first input of each frequency converter circuit except the first is the output from the preceeding circuit, and the output from the last frequency converter circuit is the input to the phase locked loop.

5 Claims, 3 Drawing Figures

SYNCHRONOUS DEMODULATOR FOR MULTI-PHASE PSK SIGNAL

BACKGROUND OF THE INVENTION

The present invention relates to a PSK (phase shift keying) demodulator, and more particularly to a PSK demodulator having a simplified carrier wave reproducing circuit.

A conventional, demodulator of this kind has a carrier wave reproducing circuit for reproducing a carrier wave from an N-phase ($N=2^n$, n being a positive integer) PSK-modulated carrier wave, and an N-phase PSK-demodulating circuit for providing demodulated signals by detecting the PSK-modulated carrier wave with this reproduced carrier wave. Such a PSK demodulating circuit generally includes as its components n phase detectors and n level decision circuits together with $(n-1)$ phase shifters. A first example of conventional carrier wave reproducing circuits (see Reference 1, William C. Lindsey et al., *Telecommunication Systems Engineering*, 1973, Prentice-Hall, pp. 55–81) comprises an N-fold frequency multiplier for frequency-multiplying by N an N-phase PSK carrier wave to generate an unmodulated carrier wave having a frequency N times as high as the carrier wave frequency, a phase synchronizing circuit or a PLL (phase locked loop) circuit for providing an unmodulated wave phase-synchronized with this unmodulated carrier wave, and a 1/N frequency divider for dividing the phase-synchronized wave by N to generate the carrier wave. A similar circuit is disclosed in the U.S. Pat. No. 3,835,404. Such wave reproducing circuit requires circuits operable in a frequency band of Nxfc higher than the carrier wave frequency band fc of the N-phase PSK carrier wave. Therefore the circuits have to meet increasingly severe requirements with an increase in number of phases, resulting in a greater cost and sometimes in the unavailability of elements operable in the required high frequency band. These disadvantages may be obviated by converting the N-phase PSK carrier wave into a lower frequency band by means of a suitable local oscillator and then supplying the converted carrier wave to the aforementioned first carrier wave reproducing circuit to enable this circuit to operate in the carrier wave band. This circuit composition, however, requires a separate local oscillator, in particular one with a small frequency drift, i.e., a highly stable local oscillator, to minimize the stationary phase error in the PLL circuit (including a voltage-controlled oscillator, a phase comparator and a low pass filter), inviting an increase in cost.

A second example of conventional carrier wave reproducing circuits (see Reference 2, U.S. Pat. No. 4,110,706) consists of an N-phase PSK modulating circuit involving n phase detectors which inversely modulates an N-phase PSK carrier wave with a demodulating signal and $(n-1)$ phase shifters, a phase-synchronizing circuit (or a PLL circuit) for generating a carrier wave phase-synchronized with the output of this modulating circuit, and a delay circuit for adjusting the delay time on each path. This carrier wave reproducing circuit, wherein the delay achieved by the delay circuit varies with the ambient temperature and other factors as stated in the reference, is incapable of proper phase synchronization. Therefore, the PSK demodulating circuit is unable to demodulate correct signals from the PSK-modulated carrier wave. There is another disadvantage that the structure of the PSK-modulating circuit enlarges with an increase in number of phases. The carrier wave reproducing circuit of the Costas loop has a similar shortcoming.

SUMMARY OF THE INVENTION

The objective of the present invention therefore is to provide a simple-structured and highly stable PSK demodulator cleared of the above-stated disadvantages.

In accordance with this invention, there is provided a PSK demodulator comprising a first means for reproducing a carrier wave from an N-phase ($N=2^n$, n being a natural number) PSK-modulated carrier wave and an N-phase PSK demodulating means for reproducing n strings of demodulated signals from the PSK-modulated carrier wave in response to the PSK-modulated carrier wave and the reproduced carrier wave, wherein the first means consists of a second means for generating the carrier wave phase-synchronized with an unmodulated carrier wave; a third means for dividing the frequency of the reproduced carrier wave by two to generate a frequency-divided carrier wave, and a fourth means for generating the unmodulated carrier wave in response to the PSK-modulated carrier wave and the frequency-divided carrier wave, wherein the fourth means consists of n fifth means connected in series, and wherein each of the fifth means consists of a sixth means for frequency-mixing the PSK carrier wave or the output wave of the fifth means of the preceding stage with the frequency-divided carrier wave, and a seventh means for frequency-multiplying the output of the sixth means and supplying the frequency-multiplied wave to the input of the fifth means of the following stage or that of the second means.

BRIEF DESCRIPTION OF THE DRAWINGS

Further features and advantages of the invention will become more apparent from the following detailed description taken in conjunction with the accompanying drawings, wherein.

DETAILED DESCRIPTION OF THE PREFERRED EMBODIMENTS OF THE INVENTION

Figure 1:
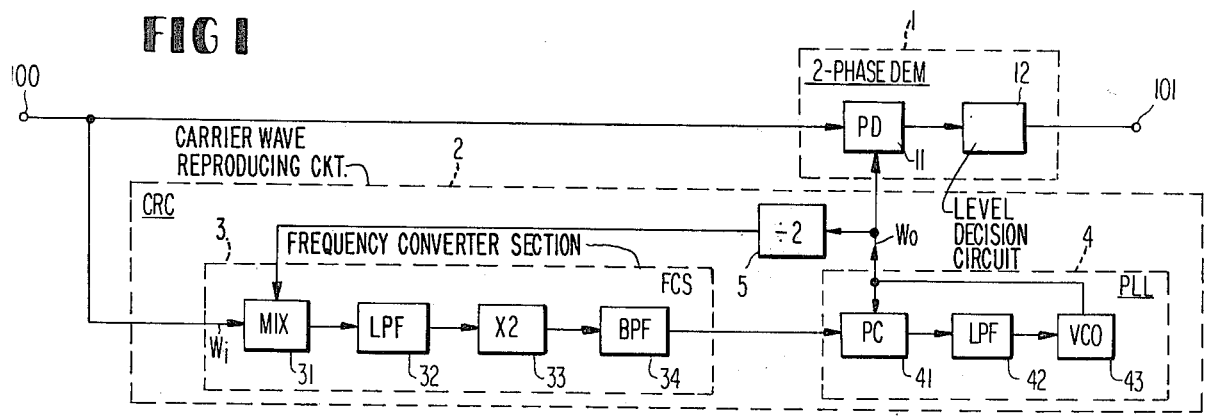
FIG. 1 is a block diagram illustrating a two-phase PSK demodulator in accordance with this invention.

In FIG. 1, a two-phase PSK demodulator of the present invention is composed of a two-phase PSK demodulating circuit 1 and a carrier wave reproducing circuit 2. The demodulating circuit 1 further comprises a phase detector 11 and a level decision circuit 12, and the carrier wave reproducing circuit 2 consists of a frequency converter section 3, a PLL circuit 4 and a ½ frequency divider 5. The frequency converter section 3 is made up of a mixer (MIX) 31, a band pass or low pass filter (LPF) 32, a frequency doubler 33 and a band pass filter (BPF) 34. The PLL circuit 4 is made up of a phase comparator (PC) 41, a low pass filter (LPF) 42 and a voltage-controlled oscillator (VCO) 43. A two-phase PSK-modulated carrier wave fed to a terminal 100 is supplied to the demodulating circuit 1 and carrier wave reproducing circuit 2. The PSK carrier wave is detected by the phase detector 11 with a carrier wave from the carrier wave reproducing circuit 2. This detected signal is identified by the level decision circuit 12 to supply a demodulated binary signal to a terminal 101.

The operation of the carrier wave reproducing circuit 2 will be described hereunder, with the carrier frequency of the two-phase PSK-modulated carrier wave $S_i$ of the carrier wave reproducing circuit 2 being represented by $w_i$ and the output frequency of the VCO 43 by $W_o$. The output of the VCO 43 is frequency-divided by the frequency divider 5 to have a frequency of $W_o/2$. The MIX 31, in response to the output of the frequency divider 5, converts the frequency of a demodulated signal $S_i$ into frequencies $w_i \pm w_o/2$. The LPF 32 filters the signal having a frequency of $w_i - w_o/2$ and then supplies it to the frequency doubler 33 to provide an unmodulated carrier wave having a frequency of $2w_i - w_o$. The output of this frequency doubler 33 is fed to one of the input terminals of the PC 41 by way of the BPF 34, and to the other input terminal is fed the output of the VCO 43. This PC 41 compares the phases of these inputs, and gives a beat signal of a frequency $(2w_i - w_o) - w_o = 2(w_i - w_o) = 2w_e$. That is to say, the phase difference $w_e$ between the input PSK carrier wave and the output of the VCO 43 emerges doubled in the output of the PC 41. Since this PLL circuit 4 is exactly identical in structure with any conventional PLL circuit except that the detection sensitivity in the PC 41 is doubled, its synchronization process is exactly the same as in any conventional PLL circuit. When this PLL circuit 4 is brought to synchronism, $2w_e$ becomes equal to 0 and consequently $w_o$ equal to $w_i$, with the result that the PLL circuit 4 provides the carrier wave identical to that of the input PSK carrier wave. In this way, the PLL circuit 4 can operate at the same frequency as that of the PSK carrier wave.

Figure 2:
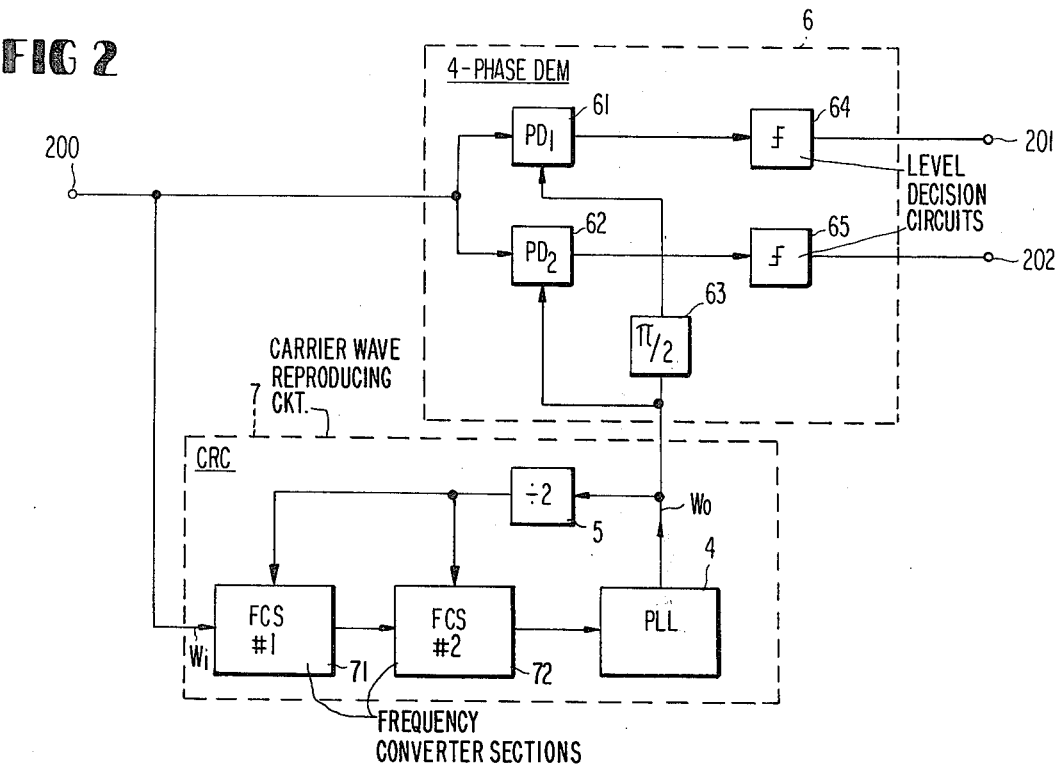
FIG. 2 is a block diagram illustrating a four-phase PSK demodulator in accordance with this invention.

Referring to FIG. 2, a four-phase PSK demodulator of the present invention consists of a four-phase PSK demodulating circuit 6 and a carrier wave reproducing circuit 7. The demodulating circuit 6 further is composed of phase detectors 61 and 62, a $\pi/2$ phase shifter 63 and level decision circuits 64 and 65; and the carrier wave reproducing circuit 7, of the PLL circuit 4, the frequency divider 5 and frequency converter sections 71 and 72. Each of the frequency converter sections 71 and 72 has exactly same structure as the frequency converter section 3 shown in FIG. 1. A four-phase PSK modulated carrier wave fed to a terminal 200 is supplied to the four-phase PSK demodulating circuit 6 and the carrier wave reproducing circuit 7. The phase detectors 62 and 61 detect the PSK-modulated carrier wave with the carrier wave from the reproducing circuit 7 and that phase-shifted by $\pi/2$ by the phase shifter 63, respectively. These detected signals are identified by the level decision circuits 64 and 65, and two strings of demodulated binary signals are supplied to terminals 201 and 202, respectively.

In the carrier wave reproducing circuit 7, the carrier frequency of the input four-phase PSK-modulated carrier wave $S_i$ being represented by $w_i$ and the output frequency of the PLL circuit 4 by $w_o$, the output of the mixer (which corresponds to the MIX 31 in FIG. 1) included in the frequency converter section 71 is a four-phase PSK-modulated carrier wave having a frequency of $w_i - w_o/2$, while the output of the frequency doubler 65 (which corresponds to the frequency doubler 33 in FIG. 1) in the frequency converter section 71 is a two-phase PSK-modulated carrier wave having a frequency of $2w_i - w_o$. The outputs of the mixer and frequency multiplying circuit in the other frequency converter section 72 are a two-phase PSK wave having a frequency of $2w_i - 3/2 \, w_o$ and an unmodulated carrier wave having a frequency of $4w_i - 3w_o$, respectively. Therefore, the output of the phase comparator in the PLL circuit 4 is a beat signal of a frequency $4w_i - 3w_o - w_o = 4(w_i - w_o) = 4w_e$ and, as in the circuit of FIG. 1, the PLL circuit 4 achieves proper synchronization to make $w_i$ equal to $w_o$. As is obvious from the foregoing description, this circuit operates in or below the carrier wave frequency band.

Figure 3:
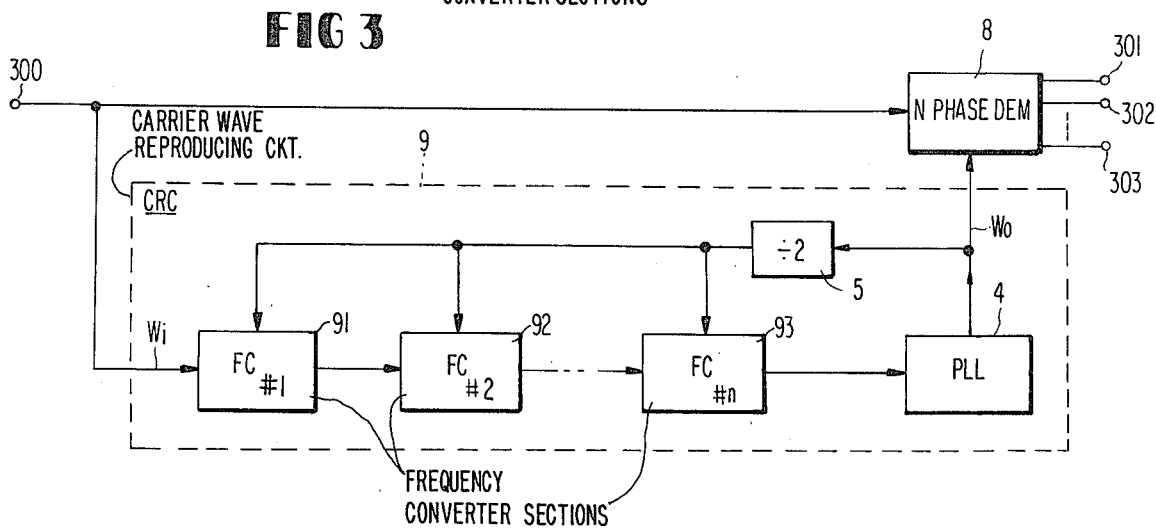
FIG. 3 is a block diagram illustrating an N-phase PSK demodulator in accordance with this invention.

In FIG. 3, an N-phase ($N = 2^n$) PSK demodulator of this invention comprises a N-phase PSK demodulating circuit 8 of known structure and a carrier wave reproducing circuit 9. The carrier wave reproducing circuit 9 consists of a PLL circuit 4, a $\frac{1}{2}$ frequency divider 5 and n frequency converter sections 91 through 93 connected in series, and each of the frequency converter sections 91 through 93 has the same structure as the frequency converter section 3 shown in FIG. 1. In the demodulating circuit 8 is demodulated an N-phase PSK-modulated carrier wave applied to a terminal 300 with a carrier wave from the carrier wave reproducing circuit 9, and n strings of demodulated binary signals are supplied to terminals 301, 302 and 303. This carrier wave reproducing circuit 9 operates in the same manner as the aforementioned reproducing circuits 2 and 7, and the output signal of the frequency converter section 91 of its first stage is a $2^{(n-1)}$-phase PSK carrier wave having a frequency of $2w_i - w_o$. The output of the frequency converter section 92 of its second stage is a $2^{(n-2)}$-phase PSK carrier carrier wave having a frequency of $4w_i - 3w_o$. Similarly, the output of the frequency converter section 93 of its nth stage is an unmodulated carrier wave having a frequency of $Nw_i - (N-1)w_o$. Accordingly, the output of the phase comparator in the PLL circuit 4 is a beat signal of a frequency $N(w_i - w_o) = Nw_e$ and, as in the foregoing description, the PLL circuit 4 achieves proper synchronization to make $w_i$ equal to $w_o$.

As is obvious from the description hitherto made, the carrier wave reproducing circuit in the demodulating circuit of the present invention has the following advantages:

(1) Irrespective of the number of phases N, the whole circuit operates in or below the carrier wave frequency band. Therefore, unlike in the first conventional carrier wave reproducing circuit referred to above, no increase in number of phases could make the circuit composition any more difficult.

(2) No separate oscillator is needed as a source of local oscillation for frequency conversion. This circuit, moreover, is immune from the stationary phase error in the PLL circuit, attributable to the frequency drift of the local oscillator.

(3) Since the absence of a delay circuit, unlike in the second conventional carrier wave reproducing circuit referred to above, prevents synchronization with a wrong phase, correct signals can be demodulated from the input PSK carrier wave.

(4) Because the sensitivity of the phase comparator rises with an increase in number of phases, the stationary phase error attributable to the frequency drift of the VCO of the carrier frequency drift of the input PSK wave control can be suppressed.

What is claimed is:

1. A PSK demodulator comprising, means for reproducing a carrier wave from an N-phase ($N=2^n$, n being a natural number) PSK-modulated carrier wave, and an N-phase PSK demodulating means for reproducing n strings of demodulated signals from said PSK-modulated carrier wave in response to said PSK-modulated carrier wave and said reproduced carrier wave, wherein said carrier reproducing means comprises, means for generating said reproduced carrier wave phase-synchronized with an unmodulated carrier wave applied as an input thereto; means for dividing the frequency of said reproduced carrier wave by two to generate a frequency-divided carrier wave; and frequency converter means for generating said unmodulated carrier wave in response to said PSK carrier wave and said frequency-divided carrier wave, wherein said frequency converter means consists of n frequency converter circuits connected in series, each having first and second inputs and an output, the output from each frequency converter circuit being applied as the first input of the succeeding frequency converter circuit except that said N-phase PSK-modulated carrier wave is applied as the first input of the first said frequency converter circuit and the output of said last frequency converter circuit is said unmodulated carrier wave, said frequency-divided carrier wave being applied as the second input to each said frequency converter circuits, each of said frequency converter circuits comprising frequency mixing means for frequency mixing its respective first and second inputs and frequency multiplying means for frequency-multiplying the output of said frequency mixing means and supplying said unmodulated carrier wave as its respective output.

2. A PSK demodulator, as claimed in claim 1, wherein said reproduced carrier wave generating means comprises a voltage-controlled oscillator for generating said carrier wave in response to a control signal, a phase comparator for comparing the phases of said unmodulated carrier wave and said reproduced carrier wave, and a low pass filter for generating said control signal in response to the output of said phase comparator.

3. A PSK demodulator as claimed in any of claims 1 or 2 wherein each of said frequency converter circuits further comprises a filter connected to the output of said frequency mixing means for passing the difference frequency output of said frequency mixing means to said frequency multiplying means.

4. A PSK demodulator as claimed in claim 1 wherein $N=2$ and said frequency converter means consists of only a single frequency converter circuit whose first input is said PSK-modulated carrier wave and whose output is said unmodulated carrier wave.

5. A PSK demodulator as claimed in claim 1 wherein $N=4$ and said frequency converter means consists of two frequency converter circuits in series.

* * * * *

UNITED STATES PATENT AND TRADEMARK OFFICE
CERTIFICATE OF CORRECTION

PATENT NO. : 4,339,725
DATED : July 13, 1982
INVENTOR(S) : Osamu ICHIYOSHI

It is certified that error appears in the above—identified patent and that said Letters Patent is hereby corrected as shown below:

Column 3, line 46, delete "has exactly same" insert --has exactly the same--

Column 4, line 66, delete "VCO of the" insert --VCO or the--

Signed and Sealed this

Twenth-eighth Day of September 1982

[SEAL]

Attest:

Attesting Officer

GERALD J. MOSSINGHOFF

Commissioner of Patents and Trademarks